UNITED STATES PATENT OFFICE.

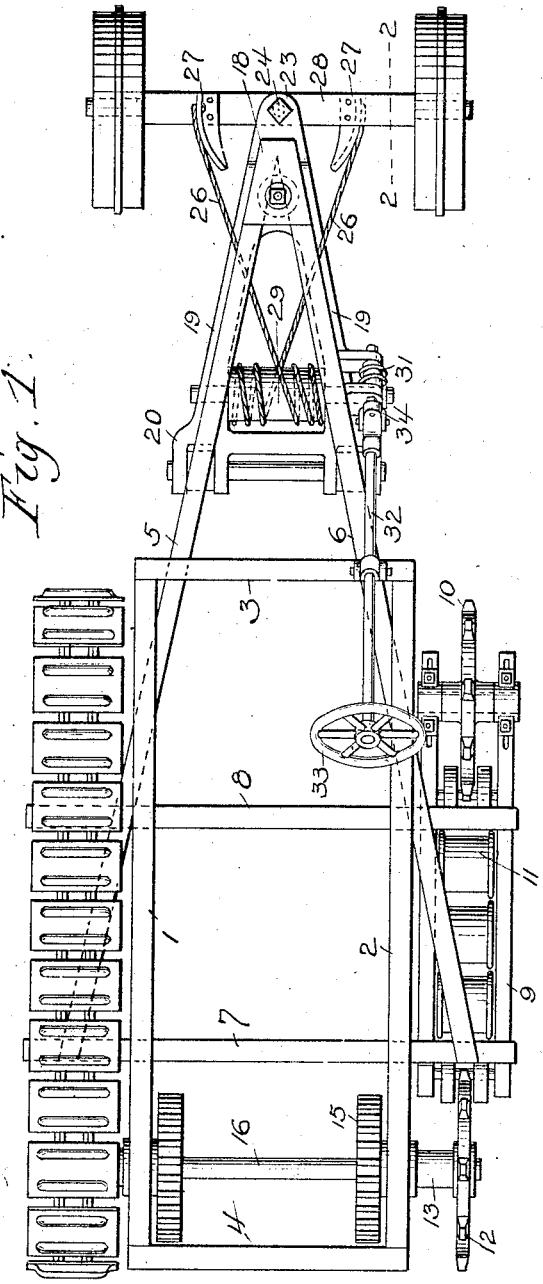
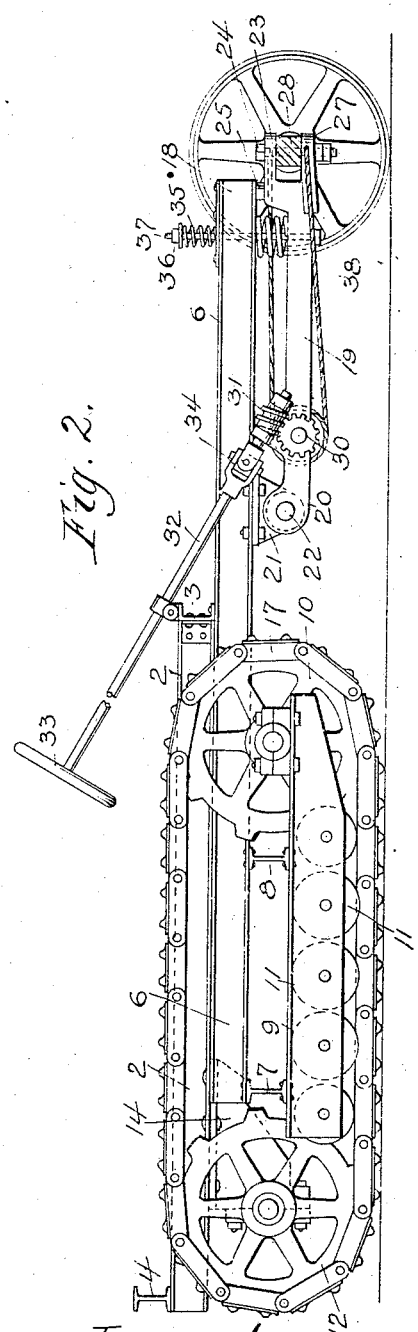

PLINY E. HOLT, OF STOCKTON, CALIFORNIA.

PIVOTED FRONT STEERING-TRUCK.

994,318.  Specification of Letters Patent.  Patented June 6, 1911.

Application filed July 1, 1909. Serial No. 505,387.

*To all whom it may concern:*

Be it known that I, PLINY E. HOLT, a citizen of the United States, and residing at 836 West Poplar street, in the city of Stockton, county of San Joaquin, and State of California, have invented certain new and useful Improvements in Pivoted Front Steering-Trucks; and I do hereby declare the following to be a full, clear, and exact description of the said invention, such as will enable others skilled in the art to which it most nearly appertains to make, use, and practice the same.

This invention relates to improvements in tractor frames, and more particularly to the steering mechanism thereof, and consists in the novel construction and arrangement of the parts as hereinafter described.

The objects sought to be accomplished are to provide a rigid frame for tractors of the traction belt type, and to hinge the steering truck in such a manner that the steering wheels will be in direct contact with the ground at all times.

Broadly, the invention consists of a main frame composed of a rectangular super-frame and an isosceles triangular sub-frame having its apex extended beyond the front and its base extended across and beyond the sides of the said super-frame; supporting trucks rigidly fixed to said base beam, and a cross beam extending across the main frame beneath the triangular portion thereof; a triangular steering frame, having a wheeled truck pivoted at the apex thereof, pivoted to and resiliently supporting the said main frame; and means for steering said truck.

In the drawings:—Figure 1 is a plan view from above of a tractor frame drawn to illustrate this invention. Fig. 2—is a side elevation of the same, the front axle on the near side being broken away at the line 2—2 Fig. 1.

In detail, the construction consists of the rectangular superframe comprising the side beams, 1 and 2, and the end beams, 3 and 4. The triangular sub-frame comprises the side beams, 5 and 6, and the base beam 7. The super and sub-frames are rigidly joined together at all points of conjunction. The main frame is further supported by the cross beam 8. The base beam, 7, and the cross beam 8, extend across and are rigidly attached to the side beams, 9, of the supporting truck located at each side of the main frame. The supporting truck is provided with the idle sprocket, 10, and the supporting rollers, 11, journaled therein. The driving sprockets, 12, are fixed on the sleeves, 13, journaled in the brackets, 14, fixed on the super frame. Said sleeves are rotated by means of gears 15 secured thereto and receiving power from any suitable source (not shown).

The purpose of mounting the driving sprocket on the same foundation as the driving mechanism is to insure proper meshing of the driving gears. It has been common practice heretofore to mount the driving sprocket in the supporting frame; but this has proved deleterious to the gearing, owing to the possibilities of disalinement due to the lost motion between the supporting trucks and the main frame. The floating axle, 16, extends across the machine within the sleeves, 13, to maintain the alinement of the driving gears. The endless traction belt, 17, passes around the idle and the driving sprockets, 10 and 12, and beneath the series of rollers, 11.

The apex of the triangular frame (which is the front portion of the main frame) is provided with the buffer head, 18. The triangular steering frame comprises the side beams, 19, terminating in the hinge lugs, 20. These lugs engage the hinge brackets, 21, which are secured to the main frame, and which support the pivot rod, 22, upon which the steering frame hinges. The front of the steering frame is provided with the divided head, 23, within which the front axle is pivoted on the king-pin, 24. The buffer head, 18, of the triangular frame rests upon the cushion block, 25, set in the head, 23.

When the steering truck is pivoted directly in the main frame, in passing over a culvert or ridge the steering wheels are raised clear of the ground, and while so raised it is impossible to alter the course of the tractor. When the steering truck is pivoted in a secondary frame hinged to the main frame, the steering wheels remain in contact with the ground under all road conditions and are thus able to perform their proper function.

The steering truck is operated by the tiller ropes, 26, fixed, as at 27, to the axle, 28, on opposite sides of the pivot thereof, and are wound in opposite direction around the drum, 29, mounted in the steering frame. This drum is rotated by the worm gear, 30, meshed with the worm, 31, fixed on the steering column, 32, mounted on the main frame and provided with the steering wheel, 33. To accommodate the swing of the steering truck the steering column is provided with the universal joint, 34.

The downward swing of the steering truck is limited by the buffer spring, 35, interposed between the buffer head, 18, and the head, 36, of the bolt, 37, which extends through the said buffer head and the steering head, 23. The impact between the steering truck and buffer head, 18, is softened by the interposed expansion spring 38.

Having thus described this invention what is claimed and desired to secure by Letters Patent is:—

1. In a tractor a main frame composed of a rectangular frame and a triangular frame having its apex extended beyond and its base extended across and beyond the said rectangular frame; supporting trucks rigidly fixed to the base beam of the triangular frame and also to a transverse beam rigidly connecting the sides of said triangular frame; a steering frame hinged to said triangular frame and having a vertical swing therefrom; and buffer springs attached to said steering frame and adapted to bear against the upper and lower sides of said triangular frame.

2. In a tractor a main frame composed of a rectangular frame combined with a triangular frame having its apex and its base angles extended beyond the said rectangular frame; a transverse beam fixed to said main frame; supporting trucks rigidly fixed to the base angles of said triangular frame and the said transverse beam; a steering frame hinged to said main frame; resilient members interposed between said steering frame and the main frame; a wheeled truck pivoted to said steering frame; and a steering mechanism mounted on said steering frame and attached to said wheeled truck.

3. In a tractor a main frame provided with a triangular member, traction trucks secured to said member at the base of the triangle, a steering frame pivotally mounted in said main frame near the apex of the triangle, a wheeled truck pivotally mounted in the forward end of said steering frame, and a steering device for controlling said wheeled truck.

4. In a tractor a main frame provided with a triangular member, traction trucks secured to said member at the base of the triangle, a triangular steering frame pivotally connected with said main frame near the apex of the triangle, a wheeled truck pivotally mounted in said steering frame at the apex of the triangle, and a steering device for controlling said wheeled truck.

5. In a tractor a main frame provided with a triangular member, traction trucks secured to said member at the base of the triangle, a triangular steering frame pivotally connected with said main frame near the apex of the triangle, a wheeled truck pivotally mounted in said steering frame at the apex of the triangle, a steering drum mounted between the sides of said steering frame and operatively connected with said truck, and means for operating said drum.

6. In a tractor a main frame provided with a triangular member, traction trucks secured to said member at the base of the triangle, a steering frame pivotally mounted in said main frame near the apex of the triangle, a wheeled truck pivotally mounted in the forward end of said steering frame, a steering device for controlling said wheeled truck, and means for limiting the vertical swing of the steering frame.

In testimony whereof, I have hereunto set my hand.

PLINY E. HOLT.

Witnesses:
JESSE VAN VALKENBURG,
PERCY S. SAUNDERS.